H. C. BUHOUP.
COUPLING CARRIER AND CENTERING DEVICE.
APPLICATION FILED AUG. 13, 1914.
1,129,547.
Patented Feb. 23, 1915.
2 SHEETS—SHEET 1.
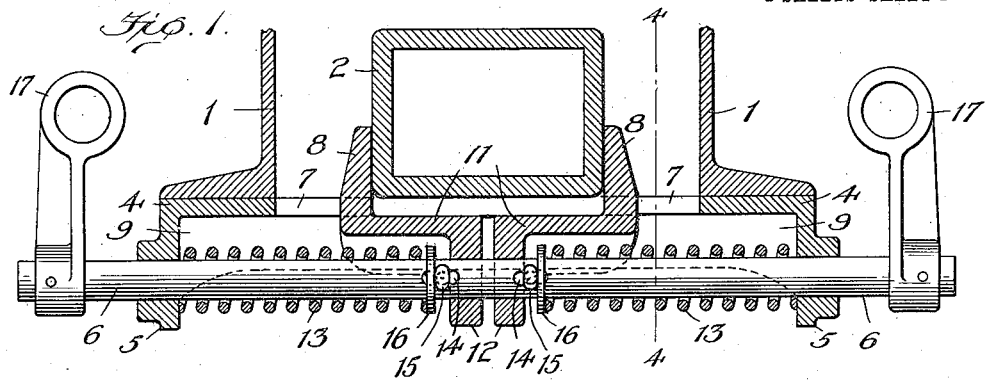
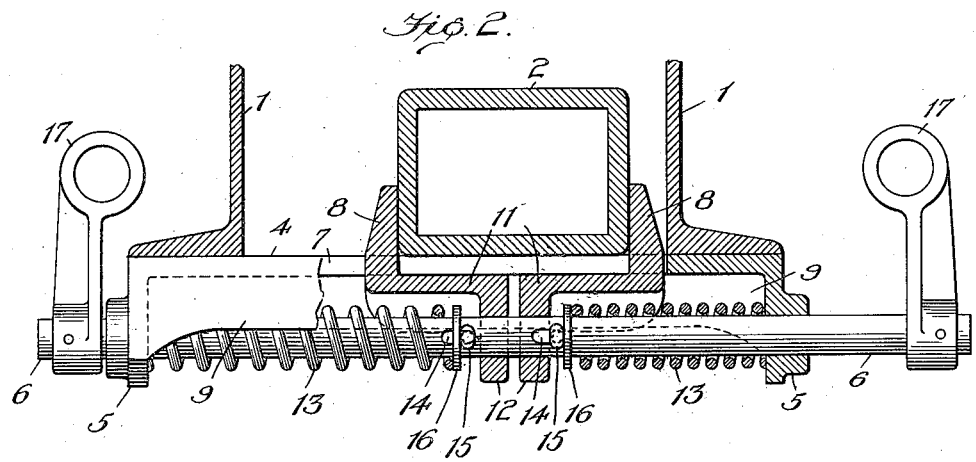
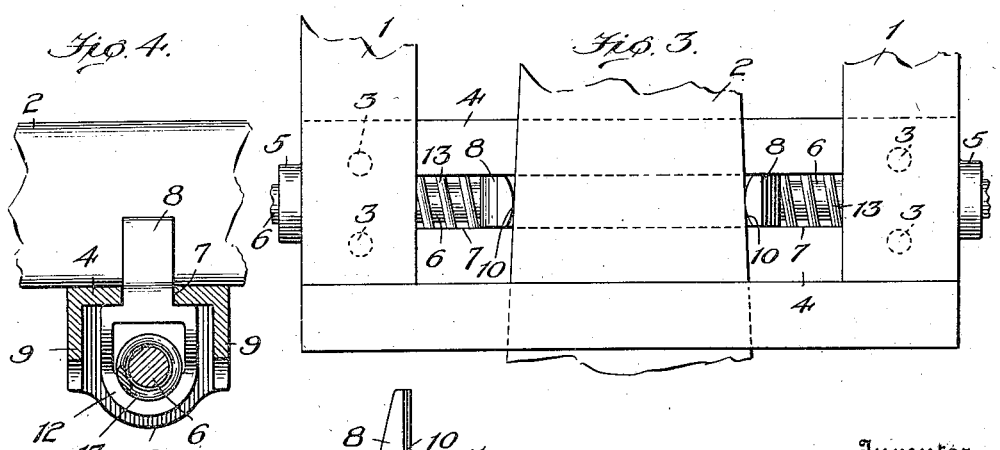
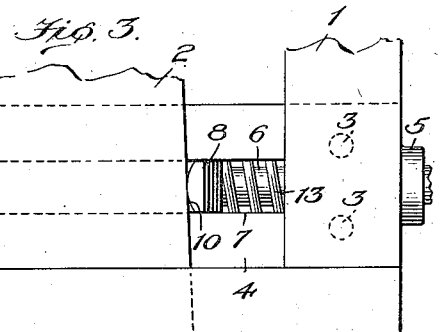
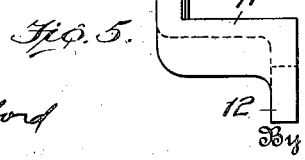
Witnesses
Edwin L. Bradford
Wm. O. Dye
Inventor
Harry C. Buhoup
By Ritter & Ritter
his Attorneys H. C. BUHOUP.
COUPLING CARRIER AND CENTERING DEVICE.
APPLICATION FILED AUG. 13, 1914.
1,129,547.
Patented Feb. 23, 1915.
2 SHEETS—SHEET 2.
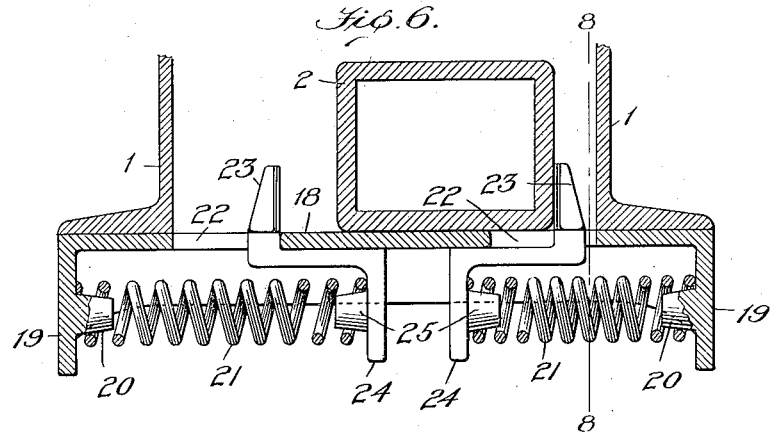
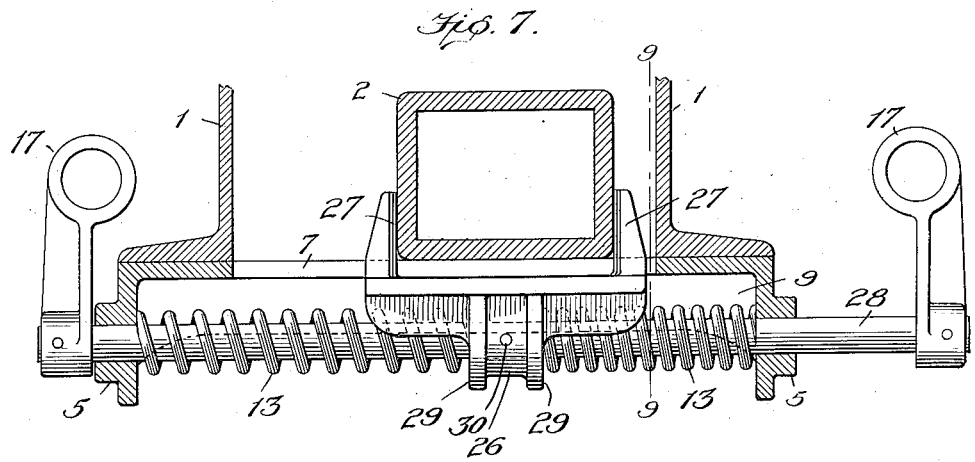
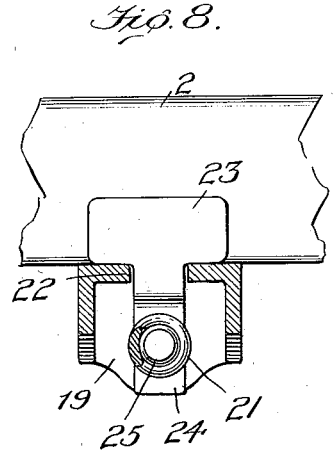
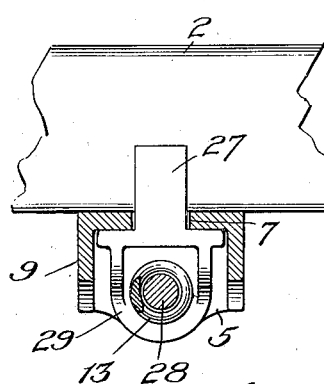
Witnesses
Edwin L. Bradford
Wm. E. Dyre
Inventor
Harry C. Buhoup
By Ritter & Ritter
his Attorneys

UNITED STATES PATENT OFFICE.

HARRY C. BUHOUP, OF CHICAGO, ILLINOIS.

COUPLING CARRIER AND CENTERING DEVICE.

1,129,547.  Specification of Letters Patent.  Patented Feb. 23, 1915.

Application filed August 13, 1914. Serial No. 356,607.

*To all whom it may concern:*

Be it known that I, HARRY C. BUHOUP, a citizen of the United States, residing at Chicago, in the county of Cook and State of Illinois, have invented certain new and useful Improvements in Coupler Carrier and Centering Devices; and I do hereby declare the following to be a full, clear, and exact description of the invention, such as will enable others skilled in the art to which it appertains to make and use the same.

My invention relates to the construction of a carrier iron and centering device for supporting the forward end of a laterally movable car coupler and for normally maintaining such coupler in the longitudinal axis of the car to which it is applied.

My invention also contemplates the combination, with a coupler carrier iron and centralizing devices, of a hose carrier which is movable with the coupler to thereby prevent the straining and breaking apart of the hose connections between cars when passing around a curve.

It is the object of my invention to provide simple devices which shall efficiently effect the purposes indicated and which are not liable to become ineffective even after a long period of service.

In its several aspects my invention, generally stated, involves a carrier member which is adapted to supportingly engage the shank of a car coupler and to permit lateral movement thereof, a follower device comprising a plurality of separable arms which extend upwardly above the coupler supporting portion of the carrier member and which are adapted to engage the sides of the coupler shank and to be moved laterally by said shank, a hose carrier device which is movable by said arms, and springs which act upon the arms of the follower device, said coupler carrier member being provided with downwardly extending spring seats, and said springs being respectively interposed between said spring seats and the adjacent arms of the follower device.

In the drawings illustrating my invention, the scope whereof is pointed out in the claims, Figure 1 is a view, partly in transverse vertical section and partly in elevation, of a combined coupler carrier and centering device with hose carrying attachments embodying my invention, a portion of the sills of a car being also shown for the purpose of illustrating the relation of my apparatus to the car to which it is applied; Fig. 2 is a view similar to Fig. 1, but illustrating the relative positions assumed by the parts when the coupler is displaced laterally from its central position; Fig. 3 is a plan view of the devices shown in Figs. 1 and 2, portions of the hose carrier being omitted; Fig. 4 is a vertical section on the line 4—4, Fig. 1; Fig. 5 is a detail elevation of one of the separable arms of the follower device employed in the construction illustrated in Figs. 1, 2, 3 and 4; Fig. 6 is a view, partly in elevation and partly in vertical central section, illustrating a modified form of my invention; Fig. 7 is a view partly in elevation and partly in vertical central section, illustrating a further modification of my invention; Fig. 8 is a vertical section taken on the line 8—8, Fig. 6; and, Fig. 9 is a vertical section taken on the line 9—9, Fig. 7.

In the drawings the center sills of the car are indicated at 1 and the coupler at 2. The coupler 2 is illustrated as provided with a tapering shank for the purpose of showing that the carrier and centralizing devices involving my invention may be advantageously applied to such a form of construction; but it is to be understood that my invention is not limited in this respect.

Secured to the car, and preferably attached to the under sides of the center sills 1 by means of suitable bolts or rivets 3, is a carrier iron having an upper member 4 which is adapted to supportingly engage the under surface of the coupler shank 2, the said carrier iron being also provided at its opposite ends with downwardly extending spring seats 5 which are preferably integrally united to the coupler supporting portion 4 of the carrier iron and which may be perforated to receive and permit the sliding movement of a rod or bar 6 by which the air, steam and signal hose pipes may be caused to move laterally with the coupler as will hereinafter appear. The coupler engaging member 4 of the carrier iron is preferably slotted, as at 7, to receive the upwardly projecting portions of separable arms or followers 8 which are respectively adapted to engage the opposite lateral faces of the shank of the coupler 2. In order to increase the strength of the carrier iron it may, if desired, be provided with vertically extending flanges 9 connecting the coupler carrier member 4 with the spring seats 5.

Movably mounted with respect to the carrier iron and projecting upwardly through the slotted member 4 thereof is a follower device which engages the opposite sides of the coupler shank 2. This follower device is preferably formed as a pair of separable arms between which the coupler shank 2 is embraced, the inner face of the upwardly extending portion of each arm being preferably rounded, as at 10, to minimize the possibility of the several parts of the device binding upon each other when the coupler 2 swings laterally as the car to which it is attached passes around a curve. Each of the arms 8 is preferably provided with a horizontally extending portion 11 that is somewhat wider than the slot 7 in the carrier member 4 and is also provided with a downwardly extending preferably perforated lug 12 which serves as a spring seat or abutment through which the pressure of centralizing springs 13 may be communicated to the respective arms 8 of the follower device. The separable arms 8, which are insertible through the slot 7 of the carrier member 4 from below said carrier iron, are retained in assembled position by reason of the fact that the horizontally extending portions 11 of the arms are wider than the slot 7 and also by reason of the fact that the slidable bar 6 of the hose carrier device extends through the perforations in the downwardly extending lugs 12 of the said arms.

Where, as is the case in the construction illustrated in Figs. 1 to 5, inclusive, a hose carrier device is employed in conjunction with a follower device involving the use of separable arms or members 8, it is preferred to provide the bar 6 of the hose carrier device with slots 14 which receive cotters 15, the said cotters being designed to bear on one side against the outer faces of the corresponding lugs 12 and being adapted to bear on the other side against corresponding adjacent washers 16 upon which the respective springs 13 are seated. It will be observed that by this means the upper portions of the separable arms 8 are enabled to constantly engage the sides of the tapering coupler shank 2 in all of the longitudinally displaced positions of the coupler, lost motion between the coupler shank and the coupler centralizing devices being thereby obviated. The reciprocating bar 6 of the hose carrier device preferably extends through the centralizing springs 13 and through perforations in the pendent spring seats 5 of the carrier iron. Hose brackets or clamps 17 of any desired form may be rigidly secured to the ends of the bar 6.

The modified form of construction shown in Figs. 6 and 8 of the drawings illustrates a carrier and coupler centering mechanism in which no provision is made for causing the air brake or other hose to swing laterally with the coupler. In this form of construction the carrier iron 18 is preferably provided at each side with downwardly extending spring seats 19 having inwardly projecting lugs or bosses 20 which are adapted to maintain the centralizing springs 21 in assembled position when the device is in service. The coupler engaging portion of the carrier iron 19 is preferably provided with a plurality of alined slots 22 each of which is of sufficient length to permit the separable arms 23 constituting the follower device to have the necessary lateral movement corresponding to the maximum lateral displacement of the coupler shank 2. Each of the separable arms 23 is provided with a downwardly extending spring seat 24 which, like the spring seats 19 of the carrier iron, are preferably provided with lugs or projections 25 that enter the interior of the corresponding springs 21 to thereby maintain the latter in place. The separable arms 23, as shown, are preferably wider at the top than at the bottom and are inserted from above through the corresponding slots 22 of the carrier iron 19. As will be readily appreciated from an inspection of Fig. 8, the widened upper portions of the separable arms 23 prevent the latter from becoming disassembled after the coupler 2 has been placed in position.

Except that the follower device which engages the sides of the shank 2 of the coupler is formed as an integral casting instead of being comprised of separable arms such as 8, the modified form of construction illustrated in Figs. 7 and 9 of the drawings differs but slightly from that shown in Figs. 1 to 5, inclusive, and heretofore described. The carrier iron, hose brackets and centralizing springs employed in the construction shown in Figs. 7 and 9 are of precisely the same construction as the corresponding parts illustrated in the principal figures of the drawings and, accordingly, corresponding reference characters have been applied thereto. The follower device 26 is, however, preferably an integral member having upwardly extending arms 27 which embrace the shank of the coupler 2 between them, such arms being sufficiently narrow to permit them to be inserted through the slot 7 in the carrier iron. The follower device 26 is preferably slotted to permit the passage of a rod or bar 28 to the opposite ends of which the hose carrying brackets 17 are secured. The centralizing springs 13 bear upon spring seats 29 formed upon the opposite faces of the follower device, which latter may be conveniently secured to the slidable rod 28 of the hose carrier device by means of a pin 30.

From the foregoing description it will be understood that when, in the construction illustrated in Figs. 1 to 5, inclusive, the coupler 2 swings laterally as the car to which it is attached passes around a curve, the follower device will execute a corresponding movement in the same direction, one of the centralizing springs 13 being compressed and the other expanding as illustrated in Fig. 2. The brackets 17 of the hose carrier device will also be caused to move laterally with the coupler, since the lateral movement of the latter at such time is communicated to the slidable bar 6 through one of the separable arms 8 and the cotter 15 which is in engagement therewith. When the car equipped with this mechanism has passed around a curve and is running upon straight track the force causing the lateral displacement of the coupler 2 from its normal position ceases to act and thereupon the expansion of that centralizing spring 13 which has been compressed, acting through the appropriate washer 16, cotter 15 and arm 8 of the follower device, causes the coupler 2 to be returned to normal position in the longitudinal axis of the car. The expansion of the centralizing spring 13 likewise causes a return movement of the hose carrier device, as will be readily understood.

The manner of operation of the modified forms of construction illustrated in Figs. 6, 7, 8 and 9 of the drawings will be easily understood from the foregoing description of the mode of operation of the preferred form of construction.

I claim:

1. A coupler carrier and centering device involving a slotted carrier member having a portion which is adapted to supportingly engage the lower side and permit lateral movement of the shank of a coupler and also having laterally disposed integrally attached pendant spring seats, a follower device extending through the slotted carrier member and provided with arms extending upwardly above the coupler engaging portion of said carrier member and being adapted to engage the sides of the coupler, said follower device also being adapted to engage the under side of the coupler supporting portion of the carrier member, and springs respectively interposed between one of said spring seats and the corresponding adjacent arm of the said follower device.

2. A coupler carrier and centering device involving a slotted carrier member having a portion which is adapted to supportingly engage the lower side and permit lateral movement of the shank of a coupler and also having laterally disposed pendant spring seats, a follower device extending through the slotted carrier member and having separable arms extending upwardly above the coupler engaging portion of the said carrier member and being adapted to engage the sides of the coupler, said follower device also being adapted to engage the under side of the coupler supporting portion of the carrier member, and springs respectively interposed between one of said spring seats and the corresponding adjacent arm of the said follower device.

3. A coupler carrier and centering device involving a slotted carrier member which is adapted to supportingly engage the lower side and permit lateral movement of the shank of a car coupler, a follower device having arms extending upwardly through the said slotted carrier member and being adapted to engage the sides of said coupler shank, a hose carrier device movably mounted on said coupler carrier member and movable by said follower device, and springs acting upon opposite sides of said follower device.

4. A coupler carrier and centering device involving a carrier member which is adapted to supportingly engage the lower side and permit lateral movement of the shank of a car coupler and which is also provided with spring seats, a follower device having a plurality of separable arms which are adapted to engage the sides of said coupler shank and to be moved laterally by said shank, a hose carrier device which is movable by said arms and which extends through and is slidable with respect to said spring seats, and springs respectively interposed between one of said spring seats and the corresponding adjacent arm of the said follower device.

In testimony whereof I affix my signature, in the presence of two subscribing witnesses.

HARRY C. BUHOUP.

Witnesses:
HARRY W. STANNARD,
JOSEPH SCHWARTZ.